United States Patent [19]

Satoh

[11] Patent Number: 4,819,889
[45] Date of Patent: * Apr. 11, 1989

[54] MAGNETIC TAPE CASSETTE

[75] Inventor: Takateru Satoh, Nagano, Japan

[73] Assignee: TDK Corporation, Japan

[*] Notice: The portion of the term of this patent subsequent to Jul. 5, 2005 has been disclaimed.

[21] Appl. No.: 909,492

[22] Filed: Sep. 19, 1986

[30] Foreign Application Priority Data

Sep. 20, 1985 [JP] Japan .................... 60-144791[U]
Oct. 2, 1985 [JP] Japan .................... 60-151433[U]

[51] Int. Cl.4 .................................... G11B 23/087
[52] U.S. Cl. ................................................. 242/199
[58] Field of Search ........................... 242/197–200, 242/194; 360/93, 96.1, 132, 130.33

[56] References Cited

U.S. PATENT DOCUMENTS

| 4,079,499 | 3/1978 | Bagozzi ............... 242/199 X |
| 4,267,986 | 5/1981 | Vemura et al. ........... 242/199 |
| 4,330,068 | 5/1982 | Shoji ................. 242/199 X |
| 4,506,846 | 3/1985 | Gelardi et al. ........... 242/199 |

Primary Examiner—John M. Jillions
Attorney, Agent, or Firm—Steinberg & Raskin

[57] ABSTRACT

A magnetic tape cassette having a four-piece structure comprising a pair of top and bottom cover plates having substantially the same construction, an intermediate frame arranged between the two cover plates of which a front portion is partially cut-out, and a tape guide block which is arranged in the cut-out front portion of the intermediate frame and arranged between the two cover plates. The tape guide block is accurately aligned with the two cover plates by aligning means, thereby preventing occurrences of irregular tape run and off-track or out-of phase recording or play.

13 Claims, 3 Drawing Sheets

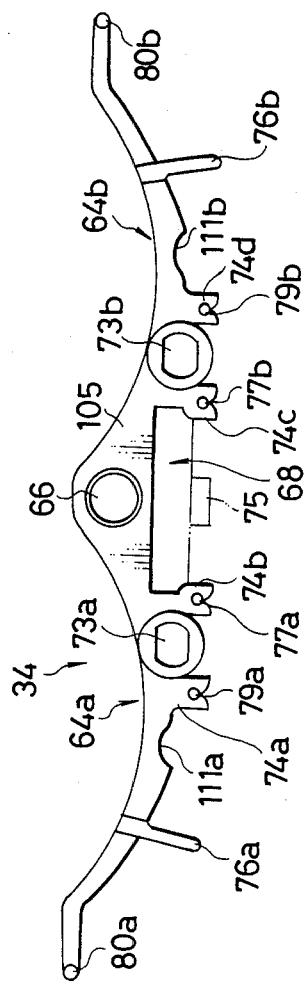
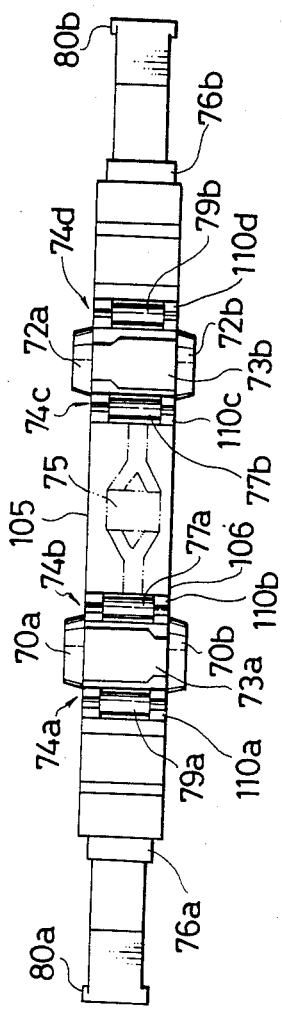
FIG.2(a)
FIG.2(b)

MAGNETIC TAPE CASSETTE

BACKGROUND OF THE INVENTION

The present invention relates to a magnetic tape cassette and, more particularly, to a magnetic tape cassette having a separate guide block which is inserted between top and bottom cover plates for guiding a tape along an open front of the tape cassette.

A conventional magnetic tape cassette is usually formed by a two-piece plastic case that is assembled by joining top and bottom half cases of substantially the same configurations, which are made of plastic material by molding. However, such plastic half cases having rather complicated configurations tend to warp due to thermal deformations and molding strains of the plastic material. Accordingly, an assembled case often involves problems such as an irregular tape run and an off-track or out-of-phase recording or play, in the tape cassette.

In order to remove these problems, to prevent the warp of the cassette case, to improve acoustic performances of the tape cassette and to increase mechanical strength of the case, a three-piece cassette case has been proposed in U.S. Pat. Nos. 4,267,986 (Uemura et al.) and 4,330,068 (Shoji), assigned to the same assignee as this application.

However, in the proposed cassette cases comprising top and bottom cover plates and an intermediate frame inserted therebetween, the intermediate frame having a thin rectangular ring form is provided with a plurality of projections on its front for guiding a tape. Hence, the intermediate frame functions not only as a frame but also as a tape guide. By functioning as the frame, the increases of the mechanical strength and the weight of the case and the prevention of the deformation of the case may be attained. It has been proven that the increase of weight prevents the cause of unnecessary resonance or vibration, with the result of a better acoustic performance. By functioning as the tape guide, a proper friction is imparted between the running tape and the contact surface of the tape guide part, which is essential for properly determining its shape and increasing its accuracy.

Thus, in the prior art, the intermediate frame has been required to function as a frame as well as a tape guide, but the functions of these two members sometimes contradict each other. In other words, in this case, the functions as the frame and as the tape guide can be attained together to only a limited degree or only by sacrificing one or the other at the same time.

In U.S. Pat. No. 4,506,846 (Gelardi et al.), a tape cassette comprising top and bottom plastic half cases and a separate tape guide for guiding a tape along the open front of the tape cassette is disclosed. In this case, the tape guide is made in a simple form to attain an accurate structure. However, since the cassette case is mainly composed of the top and bottom plastic half cases, even when the functioning of the tape guide is excellent, there are problems in the functioning of the frame. For instance, the insufficient mechanical strength of the case may cause it to bend. Further, the weight deficiency of the case is liable to cause unnecessary resonance or vibration, a problem in the acoustic performance.

SUMMARY OF THE INVENTION

Accordingly, it is an object of the present invention to provide a magnetic tape cassette, free from the aforementioned defects and disadvantages, which has superior frame function and tape guide function, a good tape running stability and excellent acoustic performance, and which is capable of preventing occurrences of an irregular tape run and an off-track or out-of-phase recording or play.

In accordance with one aspect of the invention, there is provided a magnetic tape cassette comprising a top cover plate (e.g., substantially in a flat plate form) having front, left and right side and rear portions, a bottom cover plate (e.g., substantially in a flat plate form) having substantially the same construction as the top cover plate and having front, left and right side and rear portions, an intermediate frame arranged between the top and the bottom cover plates and having front, left and right side and rear portions corresponding to those of the top and the bottom cover plates with the front portion being partially cut out, a tape guide block having front, rear, upper and lower surfaces and left and right side end portions and which is arranged in the cut-out front portion of the intermediate frame and is arranged between the top and the bottom cover plates at the front portions thereof, and means for aligning the tape guide block with the top and the bottom cover plates.

In a preferred embodiment of the invention, the tape guide block is made of synthetic resin material and the intermediate frame is made of metal.

In another preferred embodiment of the invention, the tape guide block comprises an elongated bow member with left and right side end portions thereof substantially extending in the longitudinal direction along the elongated bow member close to the left and the right side portions of the intermediate frame, to form left and right tape guide slots between the left and right side portions of the guide block and the left and the right side portions of the intermediate frame respectively, through which a magnetic tape is to be run.

In still another preferred embodiment of the invention, the aligning means include at least two projections, each of which is formed on the top or the bottom cover plates respectively, and a hole formed in the guide block, the projections being inserted in the hole from opposite openings thereof, and wherein the upper and the lower surfaces of the guide block do not contact the top and the bottom cover plates except at aligned portions, i.e. at said aligning means.

BRIEF DESCRIPTION OF THE DRAWINGS

Other and further objects, features and advantages of the invention will appear more fully from the following description of a preferred embodiment thereof taken in connection with the accompanying drawings, in which:

FIG. 2a is a top plan view of a guide block shown in FIG. 1;

FIG. 2b is a front view of the same;

DESCRIPTION OF THE PREFERRED EMBODIMENT

Figure 1:
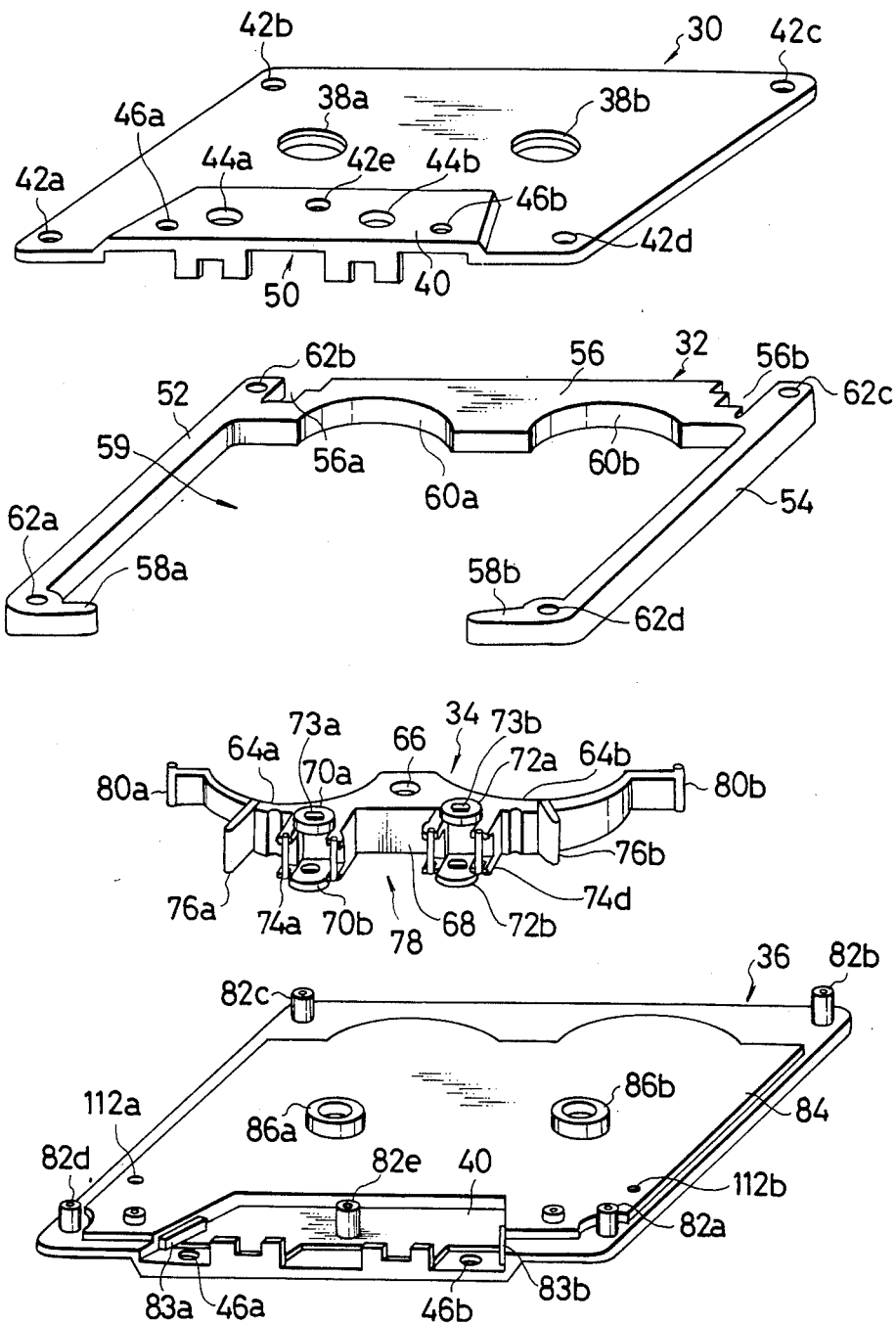
FIG. 1 is an exploded perspective view of a case of a magnetic tape cassette according to the present invention.

Referring to the drawings, wherein like reference numerals designate similar or corresponding components throughout the different figures, there is shown in FIGS. 1–3 a magnetic tape cassette according to the present invention.

In the drawings, numerals 30, 32, 34 and 36 denote a top cover plate, an intermediate frame, a guide block and a bottom cover plate, respectively. The top and the bottom cover plates 30 and 36 have substantially the same constructions except for minor differences, as hereinafter described, e.g., rectangular and approximately flat plate forms made of plastic such as by molding transparent plastic. The top and the bottom cover plates 30 and 36 are substantially of the same size as those of conventional standard products. The intermediate frame 32 has roughly a rectangular form and its front is cut out. The intermediate frame 32 is a support frame made of a metal by die casting and having upper and lower surfaces which are flat and substantially parallel to each other. The guide block 34 having an elongated bow shape made of a molded plastic, is inserted between the top and the bottom cover plates 30 and 36 and is fitted in the cut-out front of the intermediate frame 32. These four members, the top and the bottom cover plates 30 and 36, the intermediate frame 32 and the guide block 34, are assembled in order to form a four-piece cassette case, in which a tape containing part 59 for containing a magnetic tape and a head insertion part 78 where the magnetic tape and the head are contacted with each other, are formed.

The top plate 30 is provided with a pair of holes 38a and 38b formed in spaced relation substantially in the center thereof to receive shafts for driving tape hubs. The bottom plate 36 is also provided with a pair of holes in the same manner. An elevated area or a bulge 40 is formed in the central front portion of the upper surface of the top cover plate 30 and the lower surface of the bottom cover plate 36. Five screw holes 42a-42e are formed in the four corners of the top cover plate 30 and a central portion of the bulge 40 for fastening the top cover plate 30 and the three other members 32, 34 and 36 together. The bulge 40 of the top cover plate 30 or of the bottom cover plate 36 is provided with a pair of guide pin holes 44a and 44b for aligning and matching the tape cassette onto a tape player/recorder, and a pair of capstan holes 46a, 46b. The bulge 40 is formed in its central front end portion with a window 50 to be associated with the tape head, guides and the magnetic tape.

The intermediate frame 32 comprises left and right short side portions 52 and 54, a rear long side portion 56 and a pair of left and right front side portions 58a and 58b while the central front side portion is cut out, providing a space 59 for holding a reel of magnetic tape. The short and long side portions 52, 54, 56, 58a and 58b of the intermediate frame 32 extend with both upper and lower surfaces in substantially parallel planes. Near the left and right rear corners, a pair of recesses 56a and 56b for avoiding unintentional erasing of the recorded program or information of the tape are formed in the outer rear end portions of the rear long side portion 56. A pair of arc cut-outs 60a and 60b which are substantially symmetrical to the left and the right hand sides, are formed on the inner surface of the rear long side portion 56 Loose holes 62a–62d corresponding to the screw holes 42a–42d of the top cover plate 30 are also provided through all corners of the intermediate frame 32.

The guide block 34 having upper and lower flat surfaces 105 and 106 extending in the parallel planes is inserted between the bulges 40 of the top and the bottom cover plate 30 and 36. A pair of left and right ends 80a and 80b of the guide block 34 extend in the left and the right side directions respectively, near the left and the right short side portions 52 and 54 of the intermediate frame 32, thereby defining left and right guide slits 107 and 108 between the left and the right side portions 52 and 54 and the left and the right ends 80a and 80b respectively.

Figure 3A:
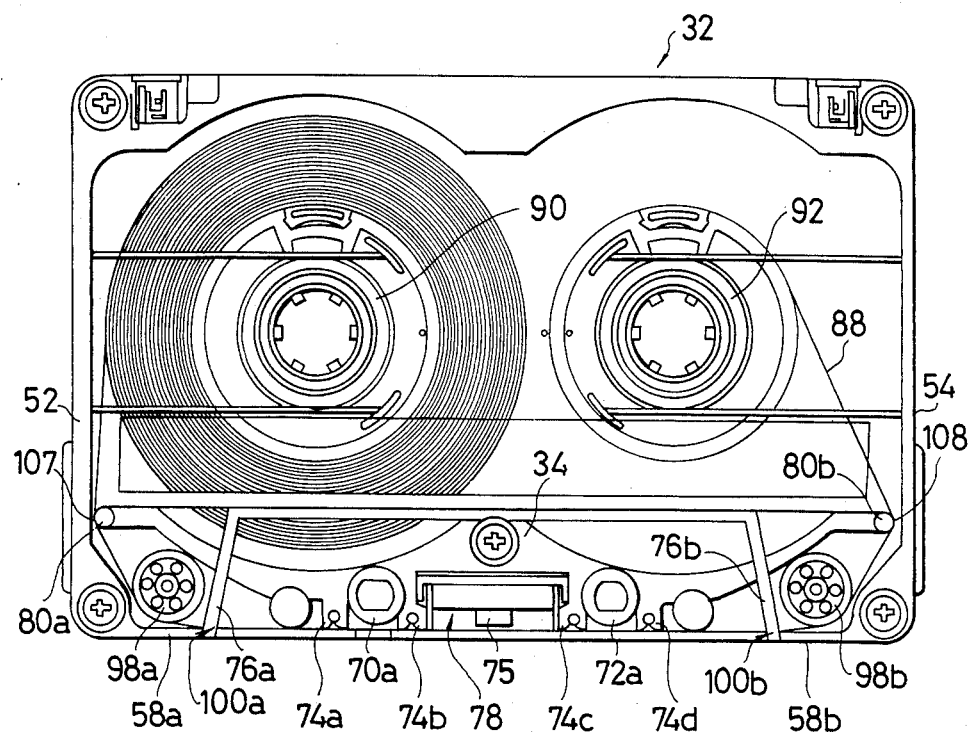
FIG. 3a is a top plan view of a magnetic tape cassette according to the present invention.

The guide block 34 is so fitted in the cut-out front portion of the intermediate frame 32 to essentially close the central cut-out portion between the front side portions 58a and 58b from the inside, as shown in FIG. 3a. The guide block 34 is also provided with a pair of arc concave portions 64a and 64b symmetrically to the left and right in its inner surface. The arc cut-outs 60a and 60b of the intermediate frame 32 and the arc concave portions 64a and 64b of the guide block 34 substantially define the outer peripheries of the reels for winding the tape.

The guide block 34 is formed with a through hole 66 in its middle portion corresponding to the hole 42e of the bulge 40 of the top cover plate 30. The central thick walled part of the guide block 34 is provided with a recess part 68 for mounting a pressure pad 75 in its front end, and on both left and right sides of the recess part 68, pairs of upper and lower ring members 70a and 70b, and 72a and 72b are disposed. In left and right through holes 73a and 73b of the ring members 70a, 70b and 72a, 72b, pair of locating guide pins (not shown) of an external tape player/recorder are inserted. The through holes 73a and 73b are standardized, and thus by inserting the guide pins into the through holes 73a and 73b, the tape cassette may be exactly aligned in the predetermined position of the tape player/recorder.

Pairs of tape guide parts 74a and 74b, and 74c and 74d are situated on both sides of the ring members 70a, 70b and 72a, 72b, each being composed of pairs of four bifurcated guide projections 110a, 110b, 110c and 110d, and four guide pieces such as metallic pins 77a, 77b, 79a and 79b are pressed into the respective bifurcated guide projections, the tape directly contacting the four pins. The guide block 34 is also provided with a pair of grooves 111a and 111b having an arc section in the left and right outer sides of the tape guide parts 74a and 74d so as to receive capstans, and a pair of side tape guide projections 76a and 76b in the intermediate portions between the tape guide parts 74a and 74d and the left and right ends 80a and 80b respectively. Between the ends of the front side portions 58a and 58b of the intermediate frame 32 and the side tape guide projections 76a and 76b of the guide block 34, a pair of slits 100a and 100b are formed, through which the tape passes, as shown in FIG. 3a.

The left and the right ends 80a and 80b of the guide block 34 function as tape guide projections, and upper and lower projections of the ends 80a and 80b are inserted in small holes 112a and 112b formed in the flat surfaces of the top and the bottom cover plates 30 and 36, as shown in FIG. 1. The guide block 34 is securely held by the top and the bottom cover plates 30 and 36 through the hole 66 in its center, the side tape guide projections 76a and 76b on its sides, and the ends 80a and 80b.

The bottom cover plate 36 has substantially the same construction as the top cover plate 30, except that five cylinders 82a–82e surrounding the holes 42a–42e at its four corners and in the central portion of its bulge 40 project inside or upwardly greater than those downwardly extending from the top cover plate 30. When assembling the top and the bottom cover plates 30 and 36, the intermediate frame 32 and the guide block 34 to form a four-piece cassette case, the cylindrical projections 82a–82e of the bottom cover plate 36 are inserted into the loose holes 62a–62d of the intermediate frame 32 and the loose hole 66 of the guide block 34 for guiding and aligning those members with one another as well as securely connecting those members.

The bottom cover plate 36 is provided with a pair of left and right support pieces 83a and 83b attached on left and right inner side walls of the bulge 40, for supporting the left and the right side tape guide projections 76a and 76b of the guide block 34. The top cover plate 30 is also provided with support pieces 83a and 83b in the same manner as the bottom cover plate 36. The bottom cover plate 36 is formed with a land 84 corresponding in shape to the central space of the intermediate frame 32 and the top cover plate 30 also has a land 84 in the same manner as the bottom cover plate 36. The bottom cover plate 36 is also formed with a pair of holes corresponding in position to the holes 38a and 38b of the top cover plate 30 to receive the shafts for driving the tape hubs and with a pair of annular collars 86a and 86b surrounding the pair of holes, into each of annular collars 86a and 86b the hub of the tape reel being loosely inserted. The top cover plate 30 is also formed with a pair of annular collars surrounding the pair of holes 38a and 38b. The bulge 40 of the bottom cover plate 36 is substantially reverse in configuration to the bulge 40 of the top cover plate 30, and its exterior structure is substantially identical with that of the top cover plate 30.

The precise aligning and matching of he guide block 34 between the top and the bottom cover plates 30 and 36 will now be described as follows. First, the position of the support hole 66 of the guide block 34 is located, and then the cylindrical projections surrounding the holes 42e of the bulges 40 of the top and the bottom cover plates 30 and 36 are fitted into the hole 66 of the guide block 34 from its upper and lower openings while the upper and the lower surfaces of the two side tape guide projections 76a and 76b are supported by the support pieces 83a and 83b of the bulges 40 of the two cover plates 30 and 36 and, at the same time, the upper and the lower projections of both the ends 80a and 80b of the guide block 34 are inserted in the holes 112a and 112b of the two cover plates 30 and 36.

Figure 3B:
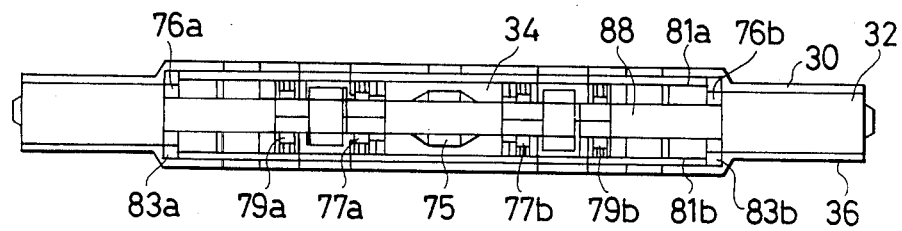
FIG. 3b is a front view of the same.

In other words, it should be noted that the guide block 34 is aligned with the top and the bottom cover plates at the support hole 66, the side tape guide projections 76a and 76b and both the ends 80a and 80b, or that the guide block 34 is supported by the two cover plates 30 and 36 only at the support hole 66, the side tape guide projections 76a and 76b and both ends 80a and 80b in the XYZ directions in the cassette case. In other words, most of the upper and lower surfaces of the guide block 34 do not contact the inner surfaces of the top and the bottom cover plates 30 and 36, with gaps 81a and 81b formed therebetween as shown in FIG. 3b.

Hence, it is readily understood that, since the guide block 34 is supported at the predetermined points or the quite small areas by the two cover plates 30 and 36, it is very hard to receive the affections of the warps of the top and the bottom cover plates. Thus, the perpendicularity of the tape contact surfaces of the tape guide parts 74a–74d, 76a–76b and 80a–80b with respect to a standard surface such as the flat surfaces of the bulges 40 of the cover plates 30 and 36 can readily be obtained, thereby improving the accuracy of the tape contact guide portions.

In this embodiment, the intermediate frame 32 and the guide block 34 are formed separately, as described above. The intermediate frame 32 may be preferably made of a metal such as zinc and aluminum or an alloy of such a metal, and the guide block 34 may be preferably made of a synthetic resin material such as polyacetal, polyamide, polyethylene and ABS.

When assembling the tape cassette, a pair of supply and take-up hubs 90 and 92 on which a magnetic tape 88 is wound are fitted around the collars 86a and 86b of the bottom cover plate 36. Then, the intermediate frame 32 and the guide block 34 are placed on the bottom cover plate 36, and then the top cover plate 30 is put on the intermediate frame 32 and the guide block 34. When the four members are accurately aligned, as described above, screws are inserted into the holes 42a–42e and tightened to align and assemble the four members.

When recording, the magnetic tape 88 supplied from the supply hub 90 passes consecutively the slit 107, the end tape guide projection 80a, a guide roller 98a, the side tape guide projection 76a, the slit 100a, the tape guide parts 74a and 74b, the pressure pad 75 arranged in the center of the head insertion part 78, simultaneously the magnetic head (not shown) of the external tape player/recorder, the tape guides 74c and 74d, the slit 100b, the side tape guide projection 76b, a guide roller 98b, the end tape guide projection 80b and the slit 108, and then is taken up by the takeup hub 92. When reproducing, the recorded tape is once wound back to the hub 90 and then travels in the same way as on recording.

From the above description of the preferred embodiment of the invention, it is readily understood that, since the cassette case is formed in a four-piece structure according to the present invention, the intermediate frame and the guide block are separately fabricated and hence the intermediate frame and the guide block may exclusively perform a frame function, and a tape guide function respectively. Therefore, both the functions may be superior.

For instance, proper materials may be selected for both members to obtain the best functioning of the two members at the same time. Thus increases of the mechanical strength and weight of the case may be readily attained, thereby effectively preventing deformation and warps of the case. Further, friction may be properly imparted to the running magnetic tape to improve the accuracy of the tape contact portions. Accordingly, the tape running stability increases and the superior contact orientation of the tape in relation to the head is attained, thereby preventing the cause of off-track or out-of-phase recording or playing. Further, since the tape is given proper friction, no irregular tape run occurs and the tape can travel smoothly. Hence, unclear sound phenomenon in the frequency modulation or the modulation noise does not happen. In addition, the wright increase of the case can be attained with the intermediate frame to improve the acoustic performance remarkably.

According to the present invention, the guide block is securely supported or held by the top and bottom cover plates partially. Most of its surfaces do not contact the inner surfaces of the two cover plates, with the result of providing clearances between the guide block and the inner surfaces of the two cover plates. Therefore, the guide block is hardly affected by the warps of the cover plates and the molding strains and hence the perpendicularity of the guide block with reference to the standard surface of the case may be readily obtained. In other words, the accuracy of the guide block location increases and hence the running tape can contact the head at a proper orientation, thereby preventing irregular tape run and off-track or out-of-phase recording or play.

Although the present invention has been described in its preferred embodiment with reference to the accompanying drawings, it is however readily understood that various changes and modifications may be made by those skilled in the art without departing from the spirit and scope of the present invention.

What is claimed is:

1. A magnetic tape cassette comprising:
a top cover plate, having front, left and right side and rear portions;
a bottom cover plate, having substantially the same construction as the top cover plate, and having front, left and right side and rear portions;
an intermediate frame arranged between the top and the bottom cover plates, having front, left and right side and rear portions corresponding to those of the top and the bottom cover plates, with the front portions being partially cut out;
a tape guide block formed separate from said top and bottom cover plates and said intermediate frame, and having front, rear, upper and lower surfaces ad left and right side end portions, which is arranged in the cut-out front portion of the intermediate frame and arranged between the top and the bottom cover plates at the front portions thereof; and
means for aligning the tape guide block with the top and the bottom cover plates.

2. A tape cassette as defined in claim 1, wherein the tape guide block is made of a synthetic resin material and the intermediate frame is made of metal.

3. A tape cassette as defined in claim 2, wherein the tape guide block comprises an elongated bow member, and the left and right side end portions thereof substantially extend in the longitudinal direction along the elongated bow member close to the left and the right side portions of the intermediate frame to form left and right tape guide slits between the left and the right side portions of the guide block and the left and the right side portions of the intermediate frame respectively, through which a magnetic tape is to be run.

4. A tape cassette as defined in claim 2, wherein the aligning means include at least two projections each of which is formed on each of the top and the bottom cover plates, and a hole formed in the guide block, the projections being inserted in the hole from opposite openings thereof, and wherein the upper and the lower surfaces of the guide block do not substantially contact the top and the bottom cover plates except at said aligning means.

5. A tape cassette as defined in claim 4, wherein the guide block is provided with a plurality of tape guide parts on the front surface thereof and with tape guide surfaces at the side end portions thereof, and wherein the top and the bottom cover plates are provided with support pieces for supporting the upper and lower surfaces of at least two of the tape guide parts of the guide block.

6. A tape cassette as defined in claim 4, wherein the projections are substantially cylindrical.

7. The cassette of claim 1 wherein the top and bottom cover plates are each in the form of a substantially flat plate.

8. A tape cassette as defined in claim 1, wherein said tape guide block aligning means comprise
a pair of side tape guide projections between said end portions of said guide block, and
a hole formed in said guide block,
with said guide block being supported by said two cover plates only at said aligning hole, at said tape guide projections, and at said end portions thereof.

9. The cassette of claim 8, wherein said aligning means additionally comprise
a pair of holes on each of said cover plates for receiving respective upper and lower projections of said end portions of said guide block.

10. The cassette of claim 8, wherein each of said cover plates comprise an elevated area or bulge formed in a central front portion thereof, and said aligning means additionally comprise
a pair of left and right support pieces attached on left and right inner side walls of each said bulge, for supporting said respective side tape guide projections of said guide block.

11. The cassette of claim 1, wherein clearances are provided between said tape guide block and both said cover plates.

12. The cassette of claim 1, additionally comprising a pair of recesses formed near outer left and right rear corners of the rear portion of said intermediate frame, to avoid unintentional erasing of the record tape.

13. A magnetic tape cassette comprising:
a top cover plate, having front, left and right side and rear portions;
a bottom over plate, having substantially the same construction as the top cover plate, and having front, left and right side and rear portions;
an intermediate frame arranged between the top and the bottom cover plates, having front, left and right side and rear portions corresponding to those of the top and the bottom cover plates, with the front portion being partially cut out;
a tape guide block formed separate from said top and bottom cover plates and said intermediate frame, and having front, rear, upper and lower surfaces and left and right side end portions, which is arranged in the cut-out front portion of the intermediate frame and arranged between the top and the bottom over plates at the front portions thereof; and
means for aligning the tape guide block with the top and the bottom cover plates;
wherein the tape guide block is made of a synthetic resin material and the intermediate frame is made of metal; and
wherein the upper and lower surfaces of the guide block do not substantially contact the top and the bottom cover plates except at said aligning means.

* * * * *